US006925834B2

(12) United States Patent  (10) Patent No.: US 6,925,834 B2
Fuchs  (45) Date of Patent: Aug. 9, 2005

(54) PORTABLE COOLER INCLUDING ICE SHEET HAVING REFRIGERANT CUBES

(76) Inventor: Mark D. Fuchs, 3403 Riviera Ct., Mequon, WI (US) 53092

( * ) Notice: Subject to any disclaimer, the term of this patent is extended or adjusted under 35 U.S.C. 154(b) by 0 days.

(21) Appl. No.: 10/661,044

(22) Filed: Sep. 13, 2003

(65) Prior Publication Data

US 2005/0056048 A1   Mar. 17, 2005

(51) Int. Cl.[7] ............................................. F25D 3/08
(52) U.S. Cl. ........................................ 62/457.2; 62/371
(58) Field of Search ...................... 62/457.1, 457.2, 62/457.3, 457.7, 371, 500

(56) References Cited

U.S. PATENT DOCUMENTS

| | | |
|---|---|---|
| 2,602,302 A | 7/1952 | Poux |
| 4,183,226 A | 1/1980 | Moore |
| 4,311,022 A | 1/1982 | Hall |
| 4,324,111 A | 4/1982 | Edwards |
| 4,517,815 A * | 5/1985 | Basso ........................ 62/457.5 |
| 4,700,706 A | 10/1987 | Munch |
| 4,741,176 A * | 5/1988 | Johnson et al. ............. 62/457.4 |
| 4,931,333 A | 6/1990 | Henry |
| 5,005,374 A * | 4/1991 | Spitler ........................ 62/259.3 |
| 5,216,900 A * | 6/1993 | Jones ......................... 62/457.2 |
| 5,570,588 A | 11/1996 | Lowe |
| 5,975,336 A * | 11/1999 | Hart ....................... 220/592.17 |
| 6,116,045 A * | 9/2000 | Hodosh et al. ............. 62/457.4 |

* cited by examiner

Primary Examiner—Melvin Jones
(74) Attorney, Agent, or Firm—John J. Horn (57) ABSTRACT

A portable cooler having one or more ice sheets including built-in refrigerant cubes. The cooler comprises an outer fabric shell and one or more sets of spaced apart refrigerant cubes encapsulated in plastic to form ice sheets that are attached to the interior walls of the cooler. The walls of the cooler may also include one or more layers of thermal insulation. The ice sheets provide a visually pleasing appearance to the inside of the cooler suggestive of cooling effects. The ice sheets may be retained along the walls of the cooler by seams sewn along the lanes passing between the refrigerant cubes, by being retained in pockets formed by sidewall liners or be being secured into chambers defined by the cooler's outer walls and a plastic insert fitted into the cooler.

46 Claims, 8 Drawing Sheets

PORTABLE COOLER INCLUDING ICE SHEET HAVING REFRIGERANT CUBES

BACKGROUND OF THE INVENTION

The present invention relates to portable coolers for foodstuffs, beverages and other articles such as biological tissue specimens and temperature sensitive chemicals and pharmaceuticals. More specifically the present invention relates to portable coolers that provide refrigerant as a built-in part of the cooler itself and to wall constructions for coolers that allow sheets of refrigerant cubes to be incorporated into the structure of the cooler itself.

Many types of portable coolers and ice chests exist that are designed for allowing food and beverages to be kept chilled for limited periods. Some coolers have a hard shell of molded plastic that gives them a rigid construction. Other types of coolers feature exterior layers of tough but pliable fabric that are sewn together to form a more flexible containment structure. Many portable coolers are used simply to provide thermal insulation and keep their contents cool by protecting against rapid heating. Unfortunately, under warm conditions these types of coolers can at most keep their contents cool for short periods of time on the order of two or three hours. Most coolers are used with blocks or cubes of ice or frozen gel solution that are usually encapsulated in plastic containers or in small polyvinyl packets. These containers or packets of freezable material are separate and removable from the coolers and are usually purchased as separate products. Prior to use the containers or packets are placed in a freezer until they become frozen solid. When placed in a cooler these frozen materials actively cool and chill the contents of the cooler as they absorb heat energy corresponding to their heat of fusion and low starting temperature. This approach can provide more long lasting effects and can even cool down beverages and food which start at room temperature. However, the containers and packets of freezable material can be inconvenient and awkward to handle and position within the cooler and can take up a lot of otherwise usable space within the interior of the cooler if they are not designed to compactly fit within the cooler.

Portable coolers are designed to be simply and easily manufactured while providing the greatest amount of cooling possible and at the same time to be as convenient to use and as visually appealing to the consumer as possible. Some existing patents exemplify current designs and illustrate the prior art pertinent to the present invention.

U.S. Pat. No. 4,324,111 to Edwards entitled Freezing Gel Containment Structure and Method provides an active cooling structure composed of adjacent plastic tubes of encapsulated freezing gel that form rigid panels for surrounding a bottle or the like. The tubes may be encased in decorative covers but the tubes and covers are not formed into closed containment structures.

U.S. Pat. No. 4,183,226 to Moore entitled Refrigerated Beverage Holder similarly describes a cylindrical sleeve of reusable refrigerant in the form of ice packs shown as elongated sealed sections of plastic. The sealed sections or bars of encapsulated refrigerant are disposed within the beverage can holder along the interior of its outer insulated wall in the space between the beverage can and the holder. The beverage can holder may include inner walls defining an annular section for containing the refrigerant.

U.S. Pat. No. 5,570,588 to Lowe entitled Freezable Insert Cooler provides a rigid molded plastic cooler body having a rectangular shape and including hollow perimeter sidewalls. A freezable gel pack insert is positioned within one or more of the hollow perimeter sidewalls and is removable so that it can be conveniently frozen apart from the cooler. The gel pack is described as being constructed of heat sealed webs that may include integral hinges.

U.S. Pat. No. 4,311,022 to Hall entitled Foldable Ice Pack provides a ice pack having a large number of separate refrigerant containing compartments within a multiple layered wall assembly of foldable plastic sheet material. The outer walls of the assembly are intended to help control the accumulation of condensation. The inner walls are heat sealed between adjacent compartments to define the compartments and form webbing strips between them. Among other things, the ice pack is described as being used with ice chests and lunch boxes.

U.S. Pat. No. 4,700,706 to Munch entitled Cold and Warm Pack For Physiotherapy And The Like describes a sleeve composed of two layers of flexible foil that are bonded together. One layer of foil is planar while the other defines cups and flanged edges. The cups are filled with special temperature storage filling material so as to function as cold or warm packs for medical use.

U.S. Pat. No. 2,602,302 to Poux entitled combination Ice and Hot Pack provides an elongated rectangular body having a series of sealed spaced-apart compartments containing water or some other refrigerant fluid. The body member is described as being composed of thin rubber or plastic sheeting which allows the member to be readily flexed. The article may be prepared for use by being placed in a freezer and may be employed for therapeutic or for the heating and cooling of other articles such as foods.

U.S. Pat. No. 4,931,333 to Henry entitled Thermal Packaging Assembly describes the use of capsules having a flexible outer skin and containing a thermal controlling agent such as a refrigerant. The capsules have sloping, rounded outer surfaces and may be efficiently packed in large numbers around items to be maintained at a controlled temperature. The capsules may also be provided in a continuous sheet in bubble pack form for being wrapped around items as packing.

SUMMARY OF THE INVENTION

The present invention comprises a portable ice cooler for refrigerating food, beverages and other articles having an ice sheet of encapsulated cubes of refrigerant built into and secured along one or more of its interior walls. In the preferred embodiment the cooler includes a soft shell of flexible fabric constructed and arranged to form a container also having a lid through which access may be gained to the interior of the container. The ice sheet is deployed along one or more of the inside walls of the container. The cooler may also include one or more layers of thermal insulation extending between the outer fabric shell and the ice sheet. The ice sheet comprises a backing layer and a top layer between which the spaced apart refrigerant cubes are encapsulated in rows and columns separated by lanes. The ice sheet may be attached to the container by plurality of seams running along the lanes between said refrigerant cubes formed by threads sewn through said ice sheet for attaching the ice sheet to the container's outer shell. Alternatively, The ice sheet may be attached to the container by dividing the ice sheet into segments and using a transparent lining to form corresponding pockets in which the segments may be secured along one or more of the interior walls of the container. In the preferred embodiment the container has a rectangular cross section but have different shapes such as being cylindrical. The cooler may have one or more zippered pockets secured along the outside of the fabric shell and its lid may include a zipper for operating as a closure.

In another aspect of the invention a wall construction for a portable ice cooler is provided including a layer of flexible fabric constructed and arranged to serve as a generally planar foundation member and an ice sheet of refrigerant cubes that is attached to the fabric layer. The ice sheet preferably comprises a backing layer and a top layer between which the spaced apart refrigerant cubes are encapsulated in rows and columns.

In a further aspect of the invention a portable cooler is provided having a plastic insert which functions as a liner. The insert cooperates with outer shell of the cooler to form one or more narrow chambers in which ice sheets having refrigerant cubes may removeably reside along the interior walls of the cooler.

It is an object of the present invention to provide a portable ice cooler for refrigerating food, beverages and other articles that is convenient to use and that integrally incorporates refrigerant into its structure.

It is another object of the present invention to provide a portable ice cooler for refrigerating food, beverages and other articles in which the heat of fusion of the refrigerant can be used to actively cool the contents of the cooler.

It is a further object of the present invention to provide a portable ice cooler for refrigerating food, beverages and other articles that provides refrigerant in the form of a sheet of visually pleasing spaced apart ice-like cubes of refrigerant.

It is yet another object of the present invention to provide a portable ice cooler for refrigerating food, beverages and other articles in the form of a container which is lined along one or more of its walls with one or more sheets of encapsulated cubes of refrigerant.

It is also an object of the present invention to provide a wall construction for a cooler that allows the refrigerant to be efficiently incorporated into the structure of the cooler.

It is also another object of the present invention to provide a wall construction for a cooler which provides a visually pleasing display of spaced-apart ice-like refrigerant cubes which suggest a cooling function.

It is a yet further object of the present invention to provide a portable cooler in which a sheet of refrigerant cubes may be removeably secured along the interior walls of the cooler.

BRIEF DESCRIPTION OF THE DRAWINGS

The invention may be better understood with reference to the following drawings in which like reference numbers are intended to refer to like elements.

DESCRIPTION OF THE PREFERRED EMBODIMENT

Figure 1:
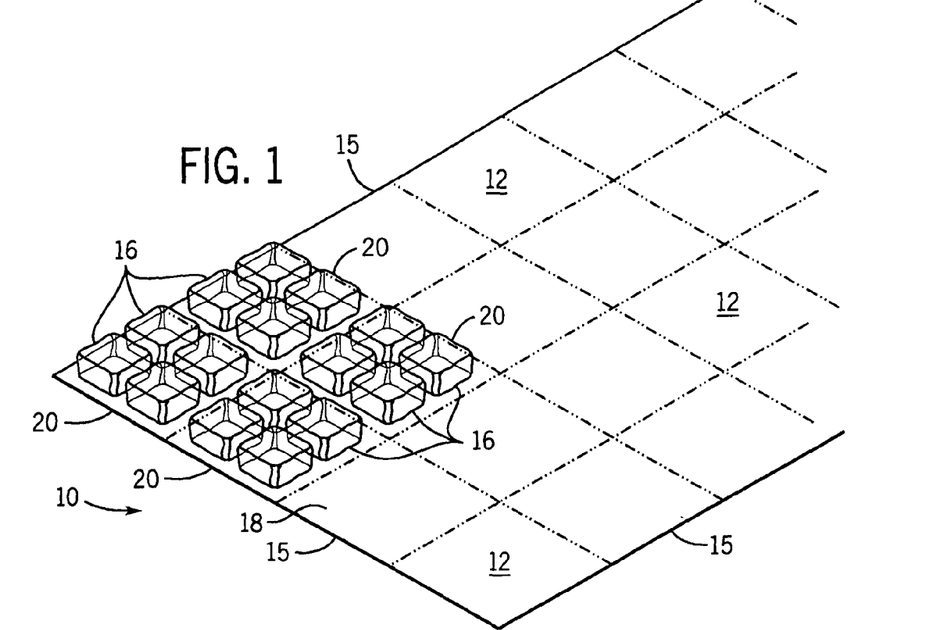
FIG. 1 provides a perspective view of a diagrammatic illustration of an ice sheet including sections or groups of multiple refrigerant cubes in accordance with the present invention.
Figure 2:
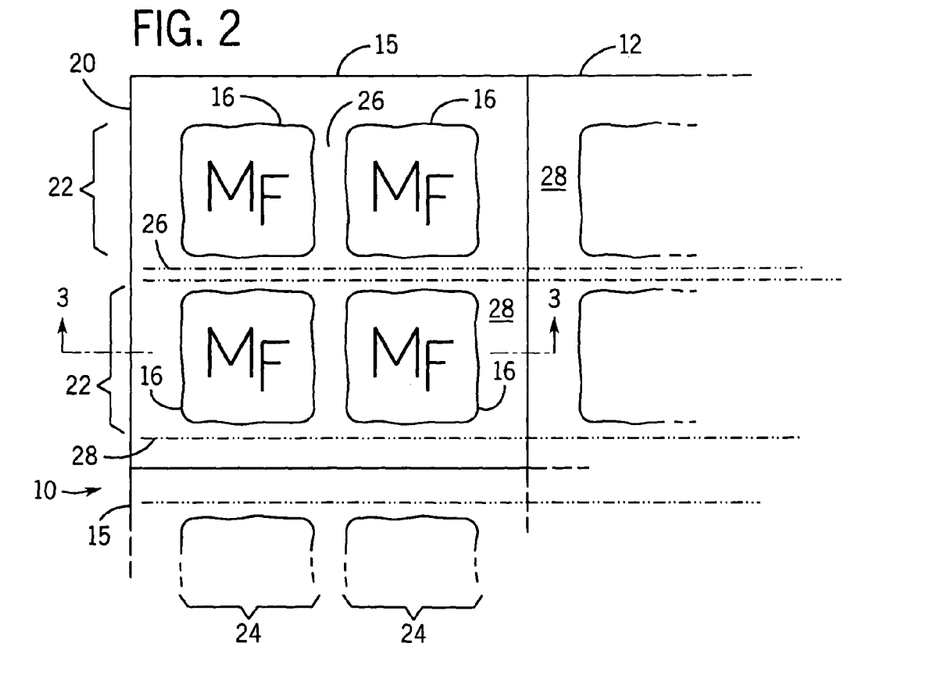
FIG. 2 provides an enlarged overhead plan view of an ice sheet shown in FIG. 1 illustrating spacing of the refrigerant cubes in accordance with the present invention.

Referring now to FIGS. 1 and 2, an ice sheet 10 is shown including a flexible but generally planar backing layer 12 and including a large number of spaced apart refrigerant cubes 16 disposed along its upper surface 18. The refrigerant cubes 16 are preferably grouped in sections 20 each of which have four cubes. The refrigerant cubes are deployed in rows 22 and columns 24 separated by lanes 26 and 28 running across the sheet 10 from its perimeter edges 15. The sectional lanes 28 running between the sections 20 of refrigerant cubes 16 are preferably somewhat wider than the other lanes between the cubes. The refrigerant cubes 16 in FIG. 2 are each shown as having a logo (the letters MF) stamped or embossed on their top surfaces.

Figure 3:
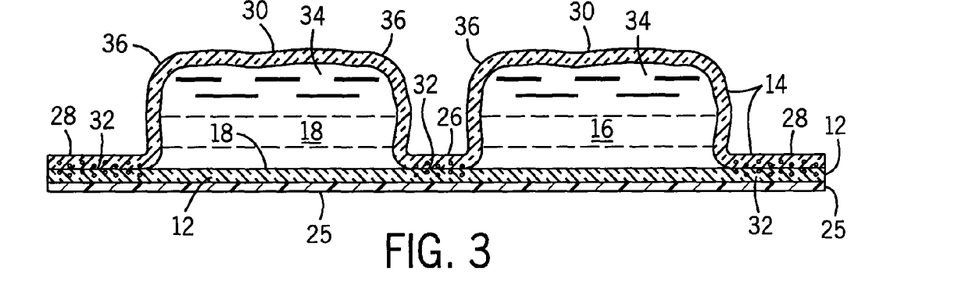
FIG. 3 provides a cross-sectional view along lines 3—3 of FIG. 2 of an ice sheet showing the details of the construction of a sheet of refrigerant cubes in accordance with the present invention.

Referring now to FIG. 3, a top layer 14 is formed into cup-shaped sections 30 and heated-sealed at joints 32 along the lanes 26 and 28 to the upper surface 18 of backing layer 12 so as to form small ice cube-like sealed compartments 34 in which the refrigerant is contained. The compartments 34 are generally cubic or prismatic in shape with rounded upper corners 36. The compartments 34 define the shapes and positions for the refrigerant cubes 16. The backing layer 12 and top layer 14 are preferably comprised of thin polyethylene films that that can be easily heat-sealed together. A very thin layer of heat reflective metal foil 25 is adhered to the far side of the backing layer opposite the cubes 16. The refrigerant preferably comprises clear water but may comprise a freezing gel solution having a somewhat lower freezing point than 32 degrees Fahrenheit. After being frozen the refrigerant cubes 16 are capable of absorbing heat energy equivalent to their heat of fusion as they melt and thereby providing a chilling effect on surrounding materials.

Figure 4:
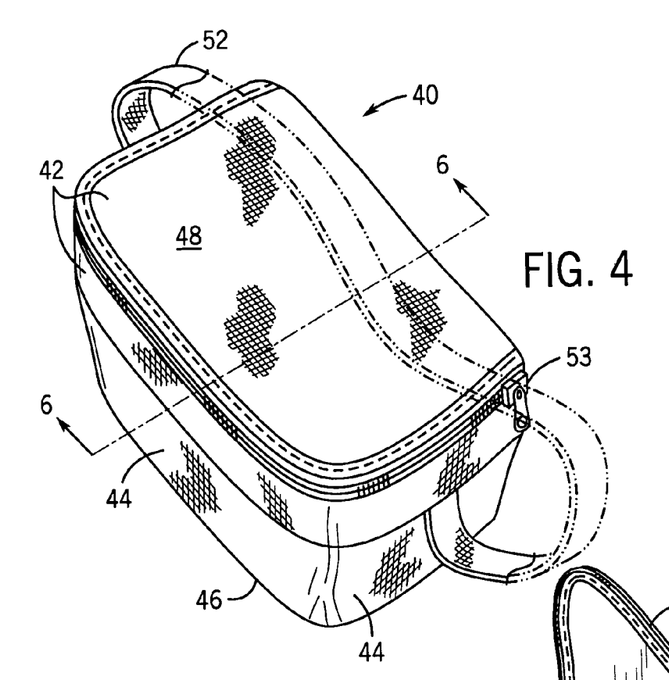
FIG. 4 provides a perspective view of a typical portable cooler having a flexible fabric outer shell and more particularly of the outside of a closed rectangular shaped cooler.
Figure 5:
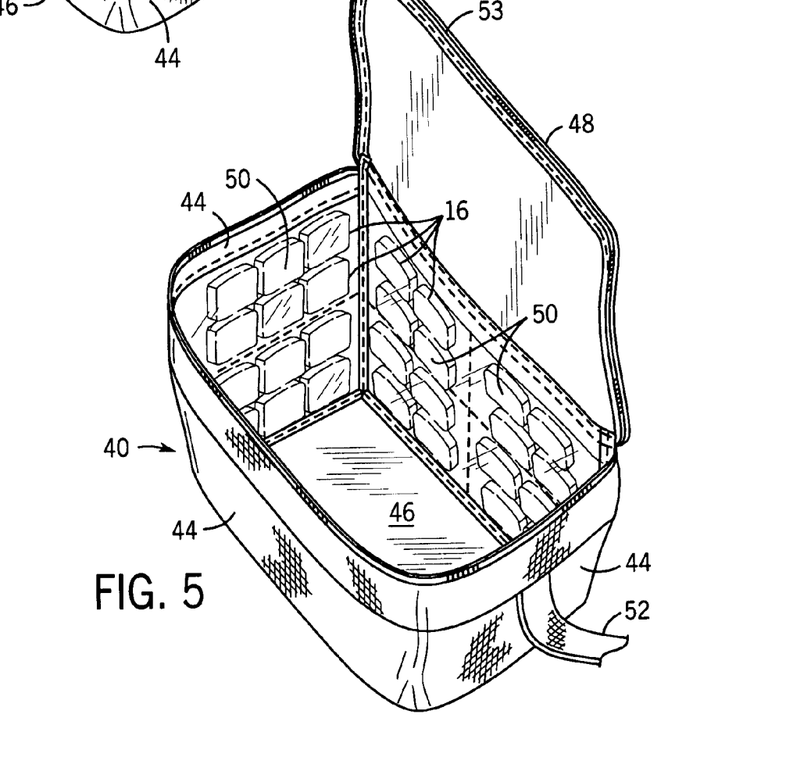
FIG. 5 provides a perspective view of the portable cooler of FIG. 4 with its top open and more particularly of the inside of an open cooler showing ice sheets deployed along the inside sidewalls of the cooler in accordance with the present invention.

Referring now to FIGS. 4 and 5, a portable cooler 40 is shown having a flexible outer shell 42 of durable fabric such as nylon. The cooler 40 includes four sidewalls 44, a bottom 46 and a lid 48 that define the rectangular structure of the container formed by the cooler 40. The cooler also includes a carrying handle 52 and a zipper 53 which extends along the top edges of the sidewalls 44 as well as along the outer edge of the lid 48. The zipper 53 acts as a closure to the cooler 40. When the zipper 53 is open the lid 48 can be tilted upward as shown in FIG. 5 so that the interior of the cooler 40 can be conveniently inspected and accessed. Ice sheets 50 including multiple refrigerant cubes 16 are attached to the interior sidewalls 44 of the cooler 40 and effectively built into the structure of the cooler 40. In preparation for use the cooler 40 is placed in a freezer or the freezer compartment of a refrigerator so that refrigerant cubes 16 can be frozen. After the refrigerant cubes 16 are solidified the cooler 40 may be taken out for use. The refrigerant cubes 16 provide active cooling or chilling of the contents of the cooler 40 during use.

Figure 6:
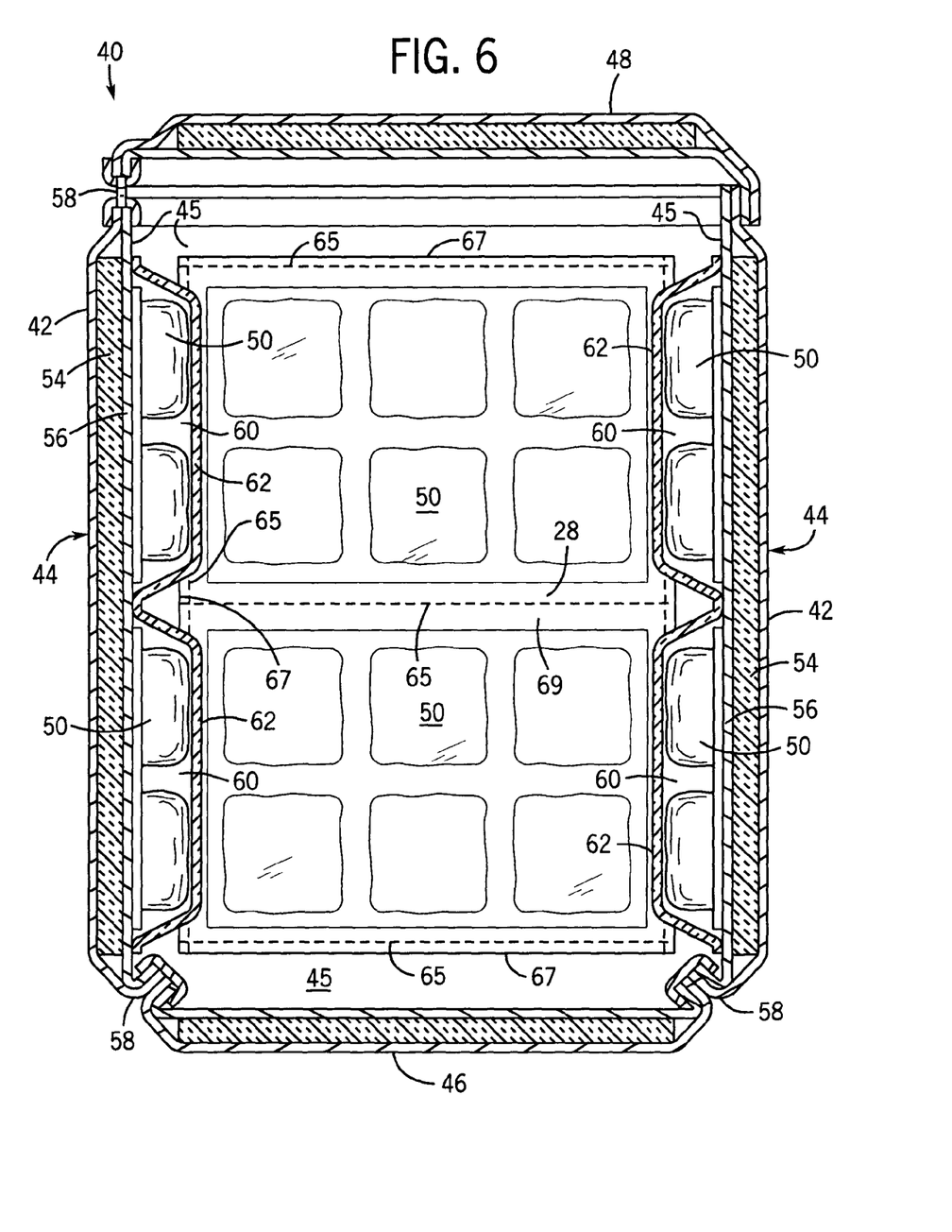
FIG. 6 provides a lateral cross-sectional view along lines 6—6 of FIG. 4 of the portable cooler illustrating the deployment of ice sheets along the inside walls of the cooler accordance with the present invention.

Referring now to FIG. 6, the sidewalls 44, bottom 46 and lid 48 of the cooler 40 each include an outer fabric shell 42, a layer 54 of thermal insulation such as polyurethane foam, and a inner lining 56 of washable plastic as shown with respect to the sidewalls 44. The sidewalls 44, bottom 46 and lid 48 are sewn and secured together at seams 58. The sidewalls 44 include the ice sheets 50 which are deployed along the interior surfaces 45 of the sidewalls 44. Segments of the ice sheets 50 are held within closed pockets 60 formed by a set of sidewall liners 62 which are secured to the sidewalls 44 by being sewn to the sidewall layers at seams 65 along their perimeter edges 67 and along the spaces 69 in between the individual ice sheets 50. The sidewall liners 62 are preferably transparent so that the refrigerant cubes are visible and the visually pleasing cooling appearance of the inside of the cooler afforded by the cubes is maintained.

Figure 7:
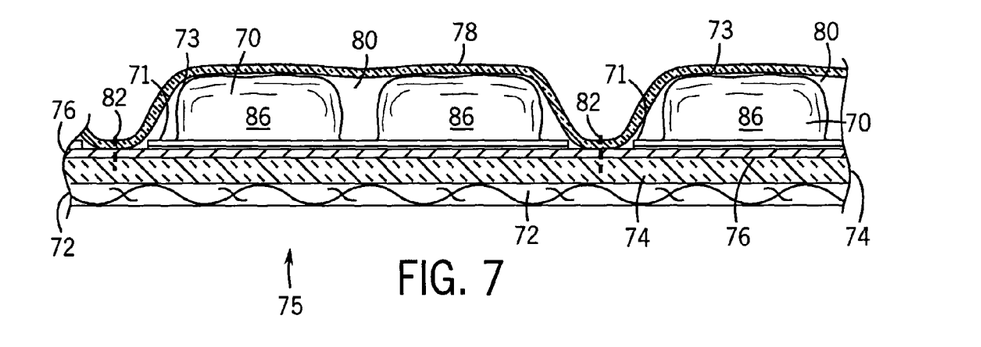
FIG. 7 provides an enlarged cross-sectional view of the typical wall for a portable cooler in accordance with the present invention illustrating the construction of the wall.

Referring now to FIG. 7, the cooler wall 75 is constructed of several layers including a fabric shell 72, an insulation layer 74, an interior plastic lining 76, ice sheets 70 and wall liner 78. The fabric shell 72 is preferably a tough and durable layer of nylon although many different types of fabrics could be employed and provides protection, structural integrity, and mechanical support. The insulation layer 74 is preferably made of polyurethane foam although many different types of thermal insulation could be employed and reduces the flow of heat into the interior of the cooler thereby helping to maintain the cooler colder for a longer period. The insulation layer 74 may also assist in providing support and structural integrity. The plastic lining 76 seals off the inside of the cooler and helps preserve cleanliness. The lining 76 may include an optional heat reflective metallic coating as further added thermal insulation. The ice sheets 70 include a backing layer 71 and a top layer 73 of polyethylene film formed to define compartments for refrigerant cubes 86. The wall liner 78 is attached to the interior lining 76 and insulation layer 74 at the seams 82 and defines the pockets 80. The seams 82 are comprised of thread sewn through the wall liner 78, the interior lining 76 and the insulation layer 74. The pockets hold the ice sheets 70 against the lining 76 thereby forming an interior wall for an ice cooler featuring active cooling of the interior contents of the cooler by the refrigerant cubes 86 of the ice sheets 70.

Figure 8:
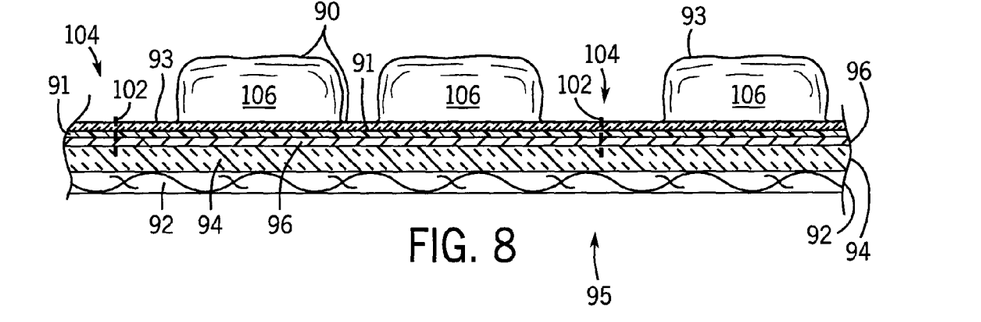
FIG. 8 provides an enlarged cross-sectional view of another typical wall construction for a portable cooler in accordance with the present invention illustrating an alternative construction for the wall.

Referring now to FIG. 8, the alternative cooler wall 95 is constructed of several layers including a fabric shell 92, a thermal insulation layer 94, an interior plastic lining 96, and ice sheet 90. The shell 92, insulation layer 94 and lining 96 are similar to the shell 72, insulation layer 74 and lining 76 of the cooler wall 75. The ice sheet 90 includes a backing layer 91 composed of a very thin sheet of heat reflective metallic foil and a top layer 93 of thin polyethylene film formed to define ice cube like compartments for the refrigerant cubes 106. In this case the ice sheet 90 is secured directly onto the lining 96 by the seams 102 which comprise thread sewn through the ice sheet 90, the lining 96 and the insulation layer 94 along the sectional lanes 104 of the ice sheet 90.

Figure 9:
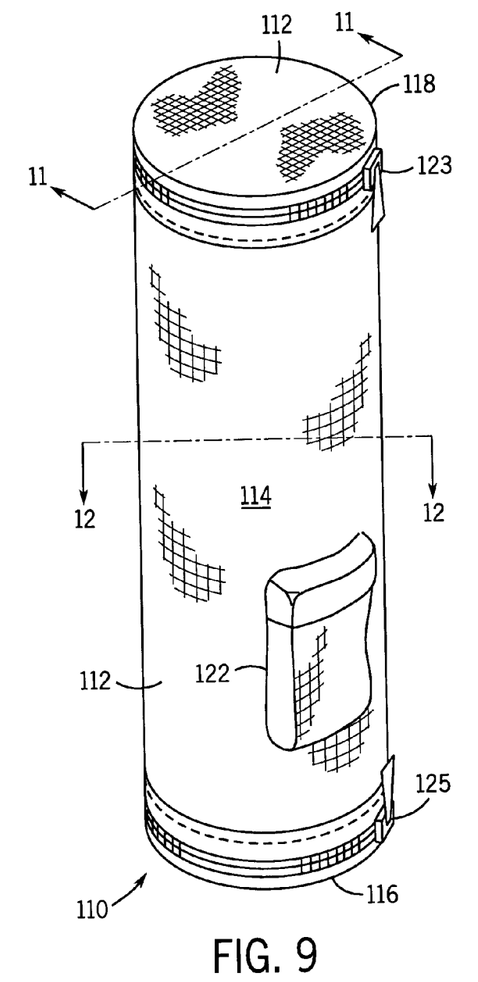
FIG. 9 provides a perspective view of a portable cooler having a cylindrical configuration and more particularly of the outside of a closed cylindrically shaped cooler.
Figure 10:
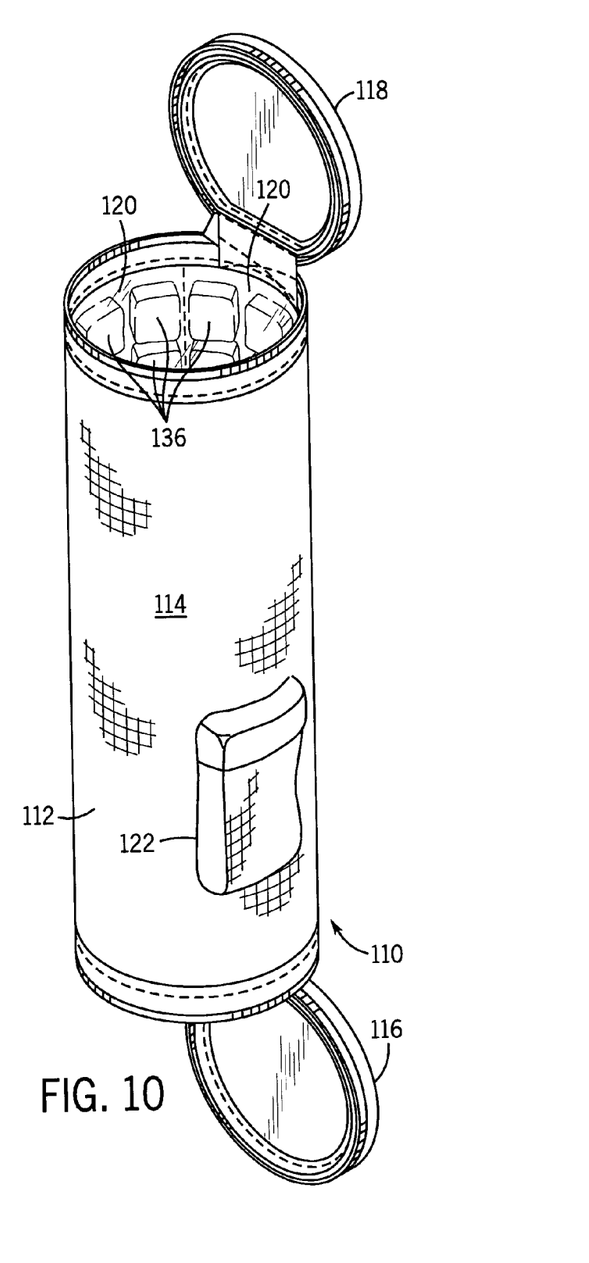
FIG. 10 provides a perspective view of the portable cooler of FIG. 9 with its top open and more particularly of the inside of an open cylindrical cooler showing ice sheets deployed along the inside sidewall of the cooler in accordance with the present invention.

Referring now to FIGS. 9 and 10, the portable cooler 110 is cylindrically shaped and has a flexible outer shell 112 of durable fabric such as nylon. The cooler 110 also includes a cylindrically shaped unitary sidewall 114, a bottom 116 and a lid 118 that define the cylindrical structure of the container formed by the cooler 110. The cooler is adapted for chilling and storing beverage cans, bottles and the like. The cooler also includes a storage pocket 122 for miscellaneous items and two zippers 123 and 125 which extend along the top and bottom edges of the sidewall 114 as well as along the outer edge of the lid 118 and bottom 116. The zippers 123 and 125 function as a closures to the main compartment of the cooler 110. When the zipper 123 is open the lid 118 can be tilted upward as shown in FIG. 10 so that the interior of the cooler 110 can be conveniently accessed. Ice sheets 120 including multiple refrigerant cubes 136 are attached to the interior sidewalls 114 of the cooler 110 and built into the structure of the cooler 110. In preparation for use the cooler 110 is placed in a freezer or the freezer compartment of a refrigerator so that refrigerant cubes 136 can be frozen. After the refrigerant cubes 136 are solidified the cooler 110 may be taken out for use. The refrigerant cubes 136 provide active cooling or chilling of beverage cans placed in the cooler 110 during use.

Figure 11:
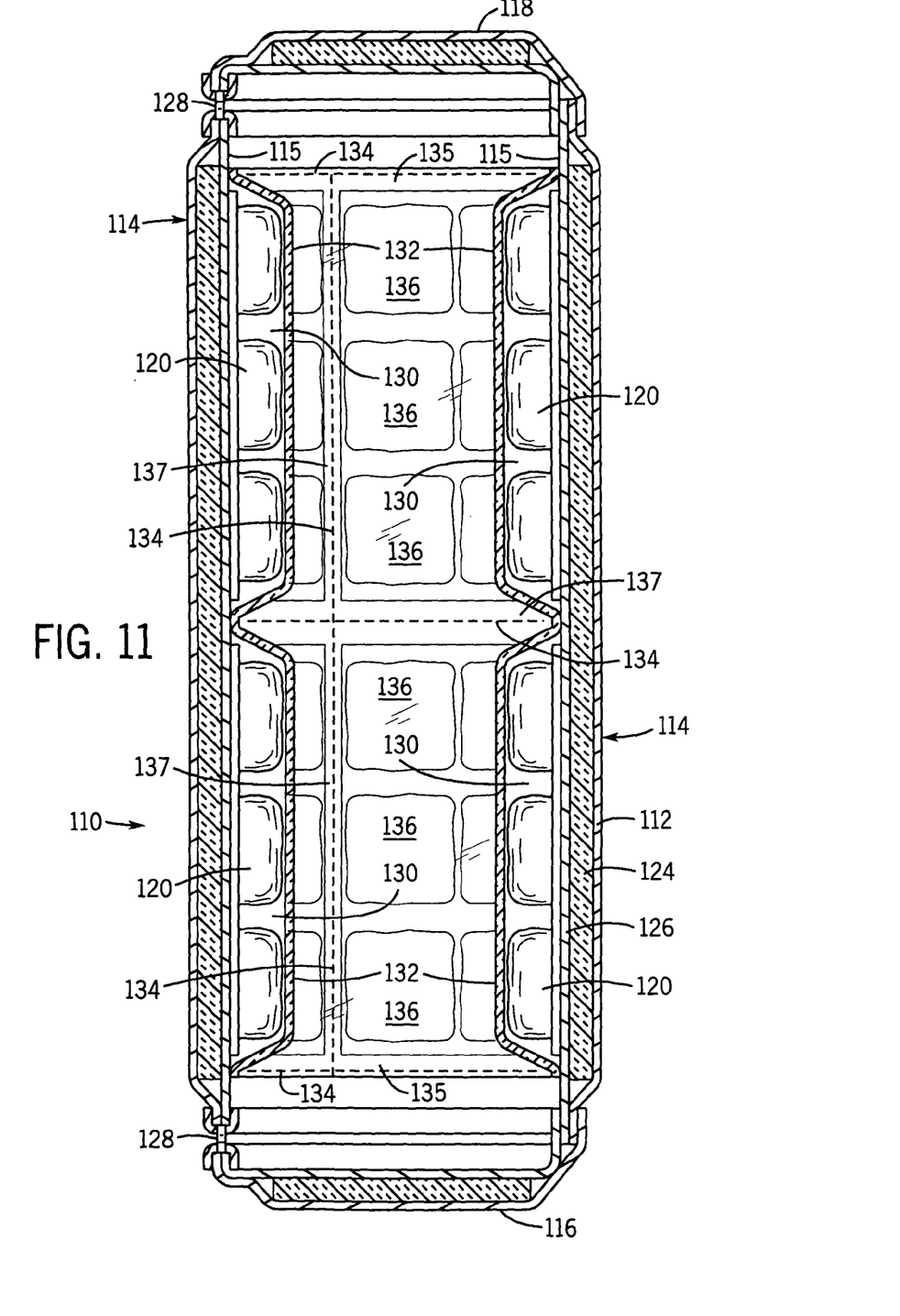
FIG. 11 provides a longitudinal cross-sectional view along lines 11—11 of FIG. 9 of the cylindrical portable cooler illustrating the deployment of ice sheets along the inside walls of the cooler in accordance with the present invention.

Referring now to FIG. 11, the sidewall 114, bottom 116 and lid 118 of the cooler 110 include an outer fabric shell 112, a layer of thermal insulation 124 such as polyurethane foam, and an inner lining 126 of washable plastic. The sidewall 114, bottom 116 and lid 118 are sewn and secured together at seams 128. The sidewall 114 includes the ice sheets 120 which are deployed along the interior surfaces 115 of the sidewall. The ice sheets 120 are held within pockets 130 formed by a set of sidewall liner 132 which are secured to the sidewall 114 by the seams 134 sewn to the sidewall layers along their perimeter edges 135 and along the spaces 137 in between the ice sheets 120. The sidewall liner 132 is preferably transparent so that the refrigerant cubes 136 are visible and the visually pleasing cooling appearance of the inside of the cooler afforded by the cubes is maintained.

Figure 12:
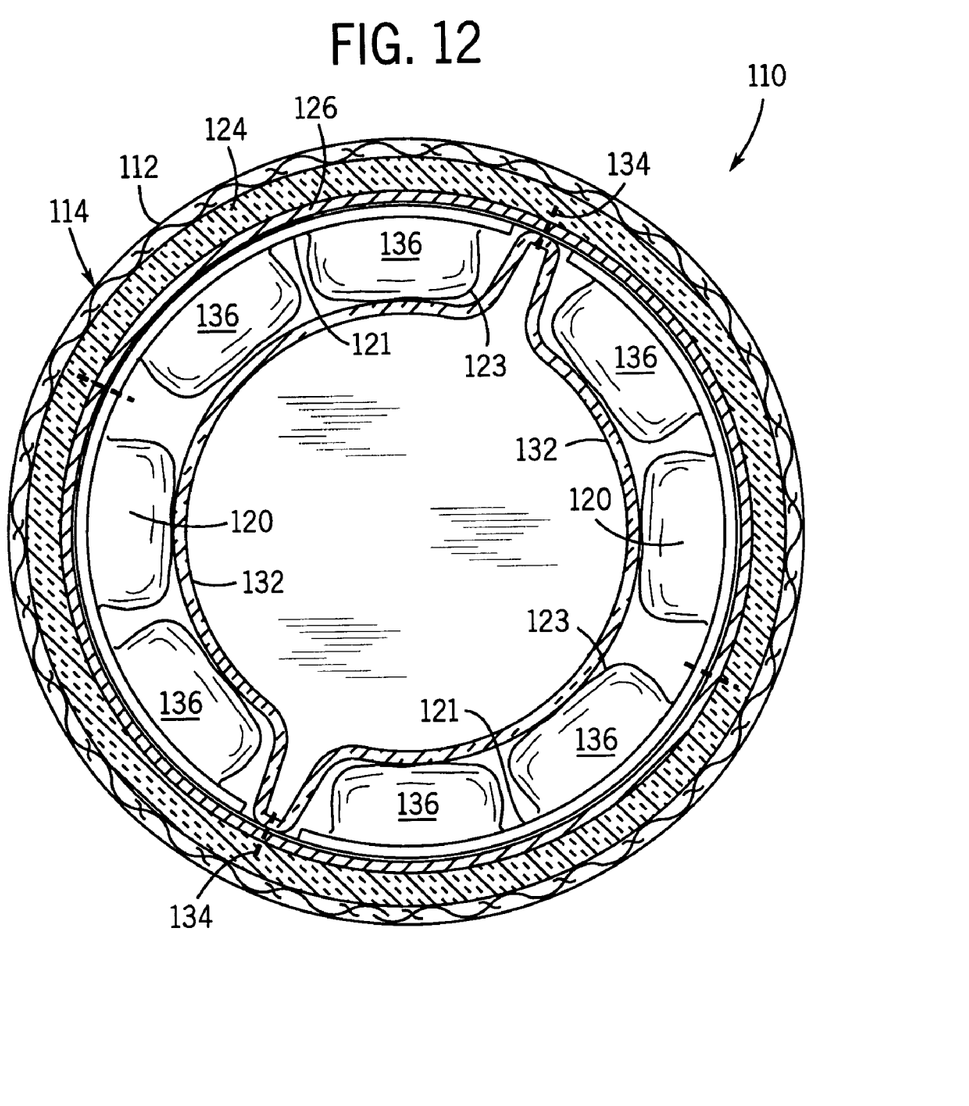
FIG. 12 provides a lateral cross-sectional view along lines 12—12 of FIG. 9 of the cylindrical portable cooler further illustrating the deployment of ice sheets and the construction of a cooler sidewall in accordance with the present invention.

Referring now to FIG. 12, the cooler sidewall 114 is constructed of several layers including a tough fabric shell 112, a thermal insulation layer 124, an inner plastic lining 126, ice sheets 120 and sidewall liners 132. The ice sheets 120 include a backing layer 121 and a top layer 123 of polyethylene film formed to define compartments for the refrigerant cubes 136. The sidewall liners 132 are attached to the interior lining 126 and insulation layer 124 at the seams 134 and define the pockets 130. The seams 134 comprise thread sewn through the sidewall liners 130, the interior lining 116 and the insulation layer 114. The pockets 130 hold the ice sheets 120 against the lining 126 thereby forming an interior wall for an ice cooler featuring active cooling of the contents of the cooler 110 by the refrigerant cubes 136 of the ice sheets 120.

Figure 13:
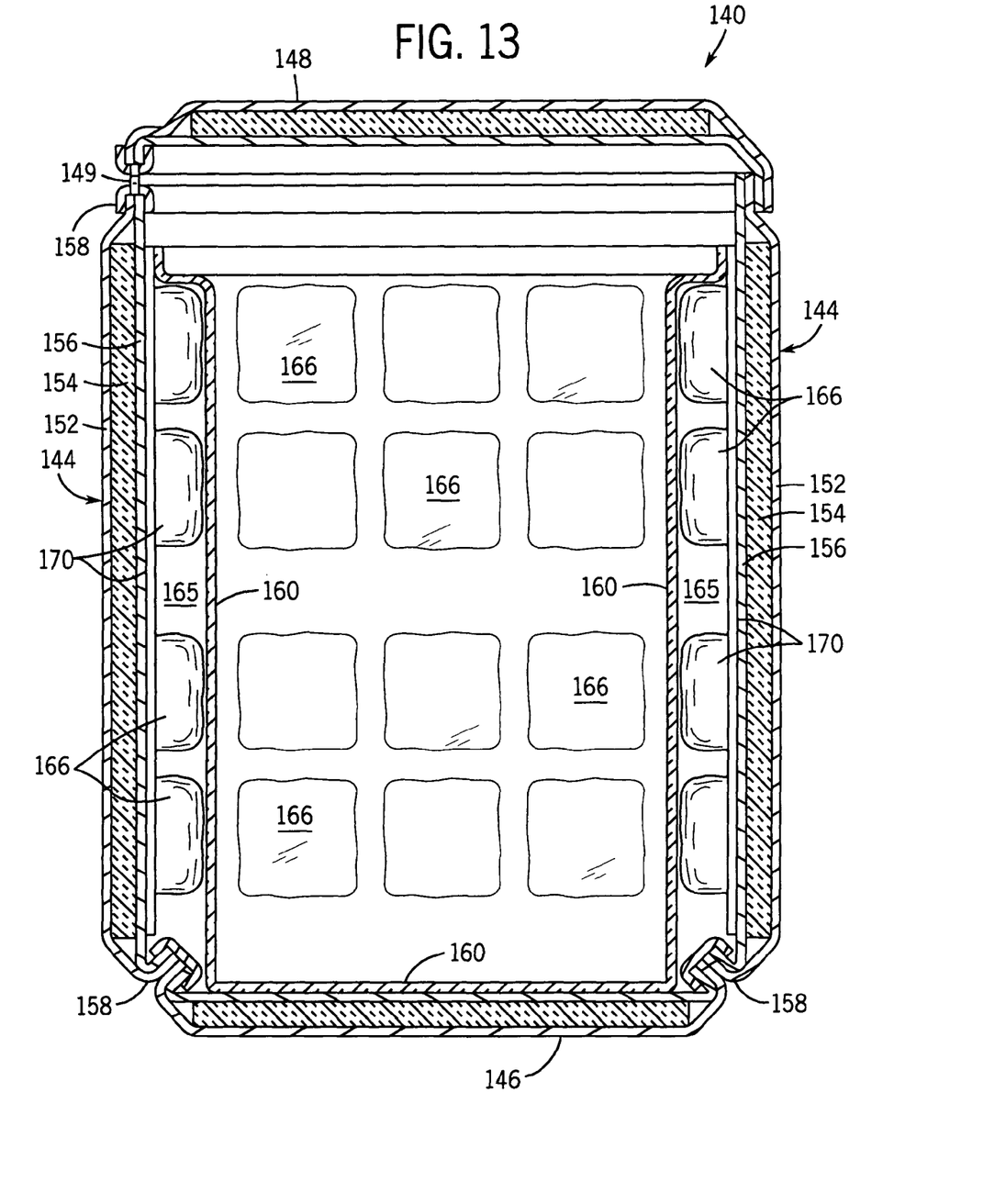
FIG. 13 provides a lateral cross-sectional view of an alternative design for a portable cooler in accordance with the present invention in which a plastic insert is used to hold the ice sheets in position along the side walls of the cooler.

Referring now to FIG. 13, the cooler 140 includes sidewalls 144, a bottom 146 and a lid 148 that define the rectangular structure of the cooler. The sidewalls 144, bottom 146 and lid 148 are sewn and secured together at seams 158. The lid 148 tilts up and pivots from the hinge 149 when the cooler 140 is open. The sidewalls 144, bottom 146, and lid 148 are constructed so as to each include an exterior fabric shell 152, a thermal insulation layer 154, and an interior plastic lining 156. The cooler 140 also includes plastic insert 160 that may be composed of a pliable sheet material but is preferably comprised of a hard plastic providing a rigid structure. The insert 160 has a rectangular shape conforming to the inside structure of the cooler 140 but is also slightly spaced apart from the sidewalls 144. The insert 160 retains the ice sheets 170 along the interior sides of the cooler against the lining 156 in the narrow cavity or chamber 165 along the sidewalls 144 between the insert 160 and the lining 156. The insert 160 is preferably transparent so that the refrigerant cubes 166 are visible and provide a visually pleasing appearance that is suggestive of cooling. The insert 160 is removable so that it can be cleaned and, more importantly, so that the ice sheets 170 can in turn also be removed and conveniently placed in a freezer so they can be solidified in preparation for the cooler 140 being used and reused. After the refrigerant cubes 166 are solidified they may be replaced into the cooler 140. The refrigerant cubes 166 then provide active cooling or chilling of the surrounding contents placed in the cooler 140 during use.

Although the present invention has been described with reference to the specific embodiments described above, it should be recognized that changes may be made in the form and details of the invention as described without departing from spirit of the invention or the scope of the claims.

What is claimed is:

1. A portable ice cooler for refrigerating food, beverages and other articles, comprising:
   a) a soft outer fabric shell constructed and arranged to form a container including interior walls defining an enclosed space and including a lid that may be manually opened or closed for access to the enclosed space; and
   b) an ice sheet including a plurality of spaced apart refrigerant cubes encapsulated in transparent material and attached to said outer fabric shell along one or more of the interior walls of said container so that said refrigerant cubes are visible from the outside when said cooler is open.

2. The portable ice cooler of claim 1, further including: an insulation layer extending between said outer shell and said ice sheet.

3. The portable ice cooler of claim 1, further including: a plurality of spaced apart seams formed by threads sewn into said ice sheet and said shell for attaching said ice sheet to said shell.

4. The portable ice cooler of claim 1, further including: a transparent lining secured to an interior wall of said container for forming a pocket in which said ice sheet is deployed and by which said ice sheet is attached to the interior wall.

5. The portable ice cooler of claim 1, wherein: said interior walls comprise a cylindrical side wall.

6. The portable ice cooler of claim 1, wherein: said lid includes a zipper secured along its perimeter for operating as a closure to said container.

7. The portable ice cooler of claim 1, further including: one or more zippered storage pockets attached to said outer shell along the exterior of said container.

8. A portable ice cooler for refrigerating food, beverages and other articles, comprising:
   a) a soft outer shell of flexible fabric constructed and arranged to form a container including interior walls defining an enclosed space within its interior and including a lid that may be manually opened or closed for access to the enclosed space; and
   b) a plurality of ice sheet segments each having a transparent top layer and including a plurality of encapsulated spaced apart refrigerant cubes permanently attached to said outer shell along one or more of the interior walls of said container so that said refrigerant cubes are visible from the outside when said cooler is open.

9. The portable ice cooler of claim 8, further including: an insulation layer extending along the interior walls of said container in between said outer shell and said ice sheet segments.

10. The portable ice cooler of claim 9, wherein: said insulation layers comprise polyurethane foam.

11. The portable ice cooler of claim 8, further including: a plurality of spaced apart seams running between said refrigerant cubes of said ice sheet segments formed by threads sewn through said ice sheet for attaching said ice sheet segments to said outer shell.

12. The portable ice cooler of claim 8, further including: a plurality of transparent linings secured to the interior walls of said container so as to form a closed pockets in which said ice sheets segments are deployed and by which said segments are attached to said interior walls.

13. The portable ice cooler of claim 8, wherein: said outer shell includes a plurality of fabric sheets sewn together at seams that define the corners of said container.

14. The portable ice cooler of claim 8, wherein: said lid includes a zipper connected along its perimeter for operating as a closure to said container.

15. A portable ice cooler for refrigerating food, beverages and other articles, comprising:
   a) a plurality of side walls, a bottom wall and a top wall defining an enclosed space having interior walls;
   b) an ice sheet including a backing layer and a transparent top layer between which a plurality of spaced apart refrigerant cubes are encapsulated in rows and columns separated by lanes; and
   c) means for attaching said ice sheet onto one of said interior walls so that the top layer of said ice sheet faces into said enclosed space and said refrigerant cubes are visible from the outside when said cooler is open.

16. The portable ice cooler of claim 15, wherein: said side walls, bottom wall and top wall comprise flexible fabric forming a soft outside shell for said cooler.

17. The portable ice cooler of claim 16, further including: an insulation layer extending between said outer shell and said ice sheet.

18. The portable ice cooler of claim 17, wherein: said insulation layer comprises polyurethane foam.

19. The portable ice cooler of claim 15, wherein: said means for attaching includes a plurality of spaced apart seams formed by threads sewn through said ice sheet along said lanes for attaching said ice sheet to said shell.

20. The portable ice cooler of claim 16, wherein:
said means for attaching includes a transparent lining secured to one of said interior walls of the container for forming a pocket in which said ice sheet is deployed and by which said ice sheet is attached to the interior wall.

21. The portable ice cooler of claim 16, wherein:
said top wall comprises a lid for said container and includes a zipper which operates as a closure for controlling access into said container.

22. A portable ice cooler for refrigerating food, beverages and other articles, comprising:
a) a plurality of side walls, a bottom wall and a lid defining an enclosed space having interior walls;
b) a plurality of ice sheet segments each including a planar backing layer and a transparent top layer between which a plurality of spaced apart refrigerant cubes are encapsulated in rows and columns separated by lanes; and
c) means for attaching said ice sheet segments to one or more of said walls so that the top layer of said ice sheet faces into said enclosed space and said refrigerant cubes are visible from the outside when said cooler is open.

23. The portable ice cooler of claim 22, wherein:
said side walls, bottom wall and lid include a layer of flexible fabric forming a soft outside shell for said cooler.

24. The portable ice cooler of claim 23, further including:
an insulation layer extending along said walls and between said outer shell and said ice sheet segments.

25. The portable ice cooler of claim 24, wherein:
said insulation layer comprises polyurethane foam.

26. The portable ice cooler of claim 23, wherein:
said means for attaching includes a plurality of spaced apart seams formed by threads sewn through said ice sheet segments along said lanes for attaching said ice sheet segments to said outside shell.

27. The portable ice cooler of claim 22, wherein:
said means for attaching includes a transparent lining secured to an interior wall of the container for forming a plurality of pockets in which said ice sheet segments are deployed and by which said ice sheet segments are attached to the interior wall.

28. The portable ice cooler of claim 22, wherein:
said lid includes a zipper which operates as a closure for controlling access into said cooler.

29. The portable ice cooler of claim 22, further comprising:
a zippered storage pocket attached to one of said side walls.

30. A construction for a wall of a portable ice cooler including exterior and interior layers, comprising:
a) a layer of flexible fabric forming the exterior layer of said cooler wall and constructed and arranged to serve as a protective outside shell for said cooler, said fabric layer having an interior surface; and
b) an ice sheet forming the interior layer of said cooler wall having a transparent interior surface and including a plurality of encapsulated spaced apart refrigerant cubes permanently attached to said interior surface of said fabric layer so that said refrigerant cubes are open to view.

31. The wall construction of claim 30, further including:
an insulation layer extending between said fabric layer and said ice sheet.

32. The wall construction of claim 31, wherein:
said insulation layer comprises polyurethane foam.

33. The wall construction of claim 30, further including:
a plurality of spaced apart seams running between said cubes formed by threads sewn through said ice sheet for attaching said ice sheet to said fabric layer.

34. The wall construction of claim 31, further including:
a transparent lining layer secured to said insulation layer opposite said fabric layer which is constructed and arranged to form a pocket in which said ice sheet is deployed and by which said ice sheet is attached to the interior surface.

35. A construction for a wall of a portable ice cooler including exterior and interior layers, comprising:
a) a layer of flexible fabric forming the exterior layer of said cooler wall and constructed and arranged to serve as a foundation component and as a protective outside shell for said cooler, said fabric layer having interior and exterior surfaces; and
b) an ice sheet forming the interior layer of said cooler wall attached to said fabric layer, said ice sheet including a backing layer and a transparent top layer between which a plurality of spaced apart refrigerant cubes are encapsulated in rows and columns separated by lanes so that said refrigerant cubes are open to view.

36. The wall construction of claim 35, further including:
an insulation layer extending between said fabric layer and said ice sheet.

37. The wall construction of claim 36, wherein:
said insulation layer comprises polyurethane foam.

38. The wall construction of claim 35, further including:
a plurality of spaced apart seams running between said cubes formed by threads sewn through said ice sheet along said lanes for attaching said ice sheet to said fabric layer.

39. The wall construction of claim 36, further including:
an insulation layer extending between said fabric layer and said ice sheet.

40. A portable ice cooler for refrigerating food, beverages and other articles, comprising:
a) a cylindrical side wall, a bottom wall and a top wall defining an enclosed space within interior walls;
b) an ice sheet including a backing layer and a transparent top layer between which a plurality of spaced apart refrigerant cubes are encapsulated in rows and columns; and
c) means for permanently attaching said ice sheet to said side wall so that said top layer and said refrigerant cubes are visible when said cooler is open.

41. The portable ice cooler of claim 40, wherein:
said cylindrical side wall, bottom wall and top wall comprise a flexible fabric for forming a soft outside shell for said cooler.

42. The portable ice cooler of claim 40, further including:
an insulation layer extending between said outer shell and said ice sheet.

43. The portable ice cooler of claim 41, wherein:
said means for attaching includes a plurality of spaced apart seams of threads sewn through side wall and ice sheet between said rows and columns.

44. A portable ice cooler for refrigerating food, beverages and other articles, comprising:
a) a soft outer shell of flexible fabric constructed and arranged to form a container including interior walls defining an enclosed space and including a lid that may be manually opened or closed for controlling access into the container;

b) a removable ice sheet having a transparent surface layer and including a plurality of encapsulated spaced apart refrigerant cubes adapted for being deployed within said enclosed space; and c) means for detachably retaining said ice sheet in position along one or more of the interior walls of the outer shell of said container with said surface layer facing into said enclosed space so that said refrigerant cubes are visible when said lid is opened.

45. The portable ice cooler of claim 44, in which said means for detachably retaining said ice sheet, includes:
   a removable insert conforming to the interior shape of said enclosed space.

46. The portable ice cooler of claim 45, in which said removable insert is comprised of a transparent rigid plastic material.

\* \* \* \* \*